(12) United States Patent
Kim et al.

(10) Patent No.: US 9,667,778 B2
(45) Date of Patent: May 30, 2017

(54) APPARATUS AND METHOD FOR PROCESSING MISSED CALL

(71) Applicant: Samsung Electronics Co., Ltd., Suwon-si, Gyeonggi-do (KR)

(72) Inventors: Sukdong Kim, Suwon-si (KR); Junho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 14/661,407

(22) Filed: Mar. 18, 2015

(65) Prior Publication Data

US 2015/0271323 A1    Sep. 24, 2015

(30) Foreign Application Priority Data

Mar. 19, 2014  (KR) ........................ 10-2014-0032074

(51) Int. Cl.
| | |
|---|---|
| *H04W 4/16* | (2009.01) |
| *H04M 3/42* | (2006.01) |
| *H04M 1/22* | (2006.01) |
| *H04W 68/00* | (2009.01) |
| *H04M 3/02* | (2006.01) |

(52) U.S. Cl.
CPC ......... *H04M 3/42195* (2013.01); *H04M 1/22* (2013.01); *H04M 3/02* (2013.01); *H04W 4/16* (2013.01); *H04W 68/00* (2013.01)

(58) Field of Classification Search
None
See application file for complete search history.

(56) References Cited

U.S. PATENT DOCUMENTS

| | | | |
|---|---|---|---|
| 2007/0280458 A1 | 12/2007 | Aberethy et al. | |
| 2008/0039152 A1 | 2/2008 | Arisawa | |
| 2009/0075631 A1 | 3/2009 | Lyle et al. | |
| 2011/0300883 A1* | 12/2011 | Kwon ................... | H04M 1/575 455/457 |
| 2012/0286965 A1 | 11/2012 | Rautiainen | |
| 2013/0057762 A1* | 3/2013 | Yoshida ................. | G08C 17/02 348/552 |
| 2013/0208575 A1 | 8/2013 | Sammut | |
| 2015/0271323 A1* | 9/2015 | Kim ................... | H04M 3/42195 455/414.1 |
| 2016/0150089 A1* | 5/2016 | Garg ..................... | H04M 7/003 370/352 |

FOREIGN PATENT DOCUMENTS

| | | |
|---|---|---|
| EP | 1 802 086 A2 | 6/2007 |
| KR | 10-2006-0057227 A | 5/2006 |
| KR | 10-2007-0011837 A | 1/2007 |
| KR | 10-2014-0026721 A | 3/2014 |

* cited by examiner

*Primary Examiner* — Diane Mizrahi
(74) *Attorney, Agent, or Firm* — Jefferson IP Law, LLP

(57) ABSTRACT

A method and apparatus for processing a missed call are provided. In one embodiment, an electronic device checks whether an incoming call received through a communication network is connected. If the incoming call is not connected, the electronic device detects whether the incoming call is terminated. If the incoming call is terminated, the electronic device recognizes this as a missed call and maintains a call notification in the same form as used when the incoming call is received. Other various embodiments are provided.

30 Claims, 12 Drawing Sheets

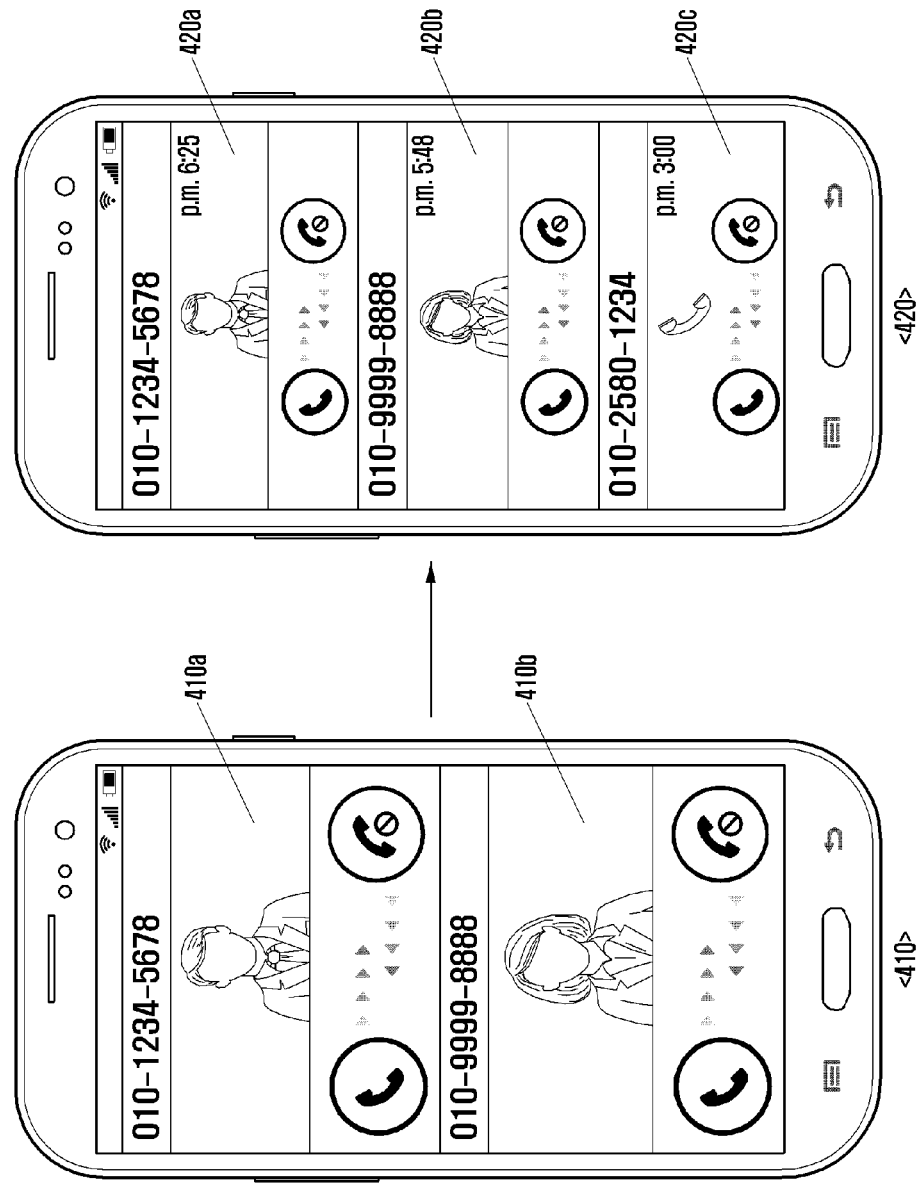

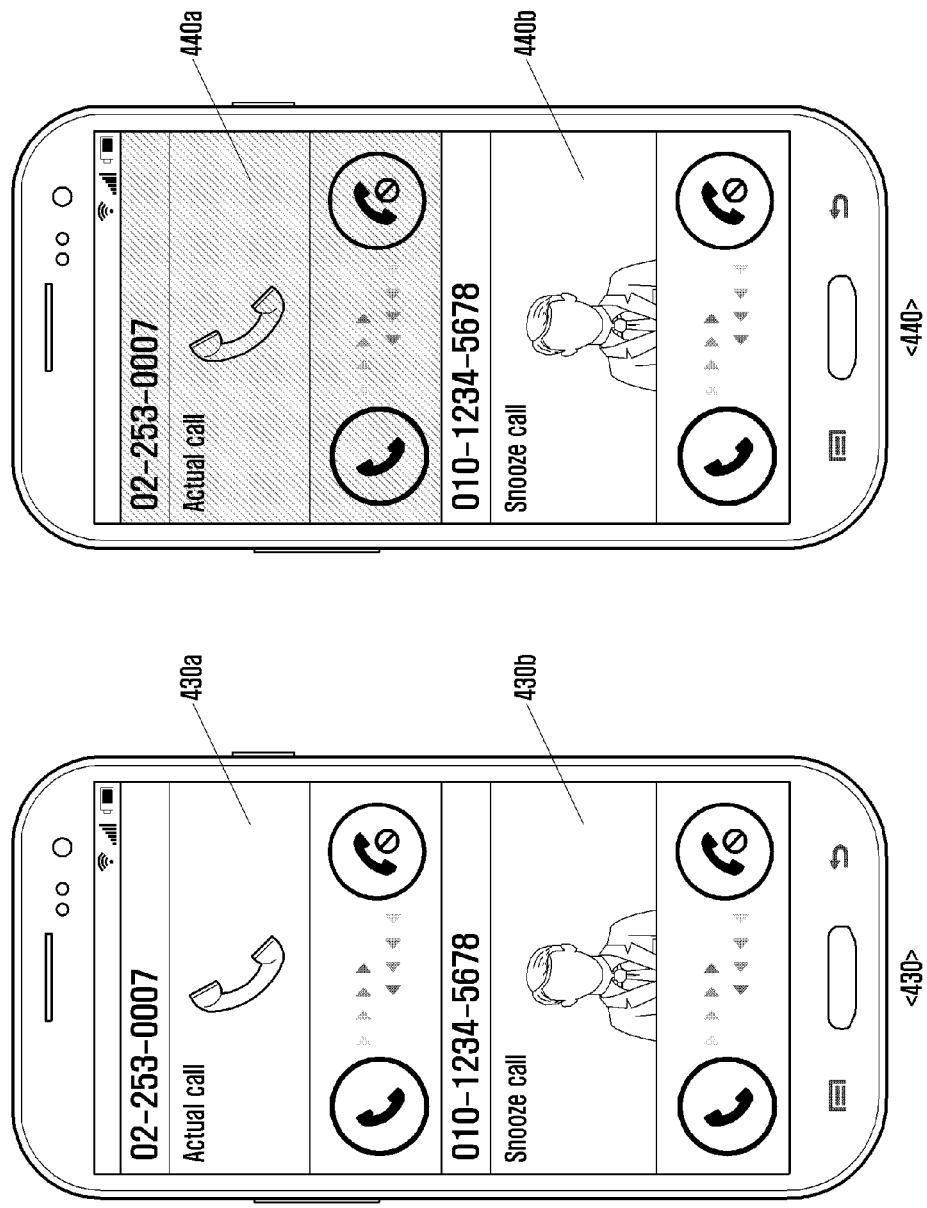

FIG. 6A
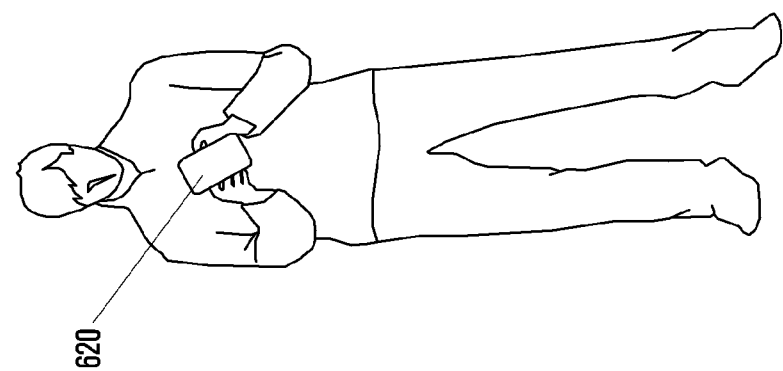
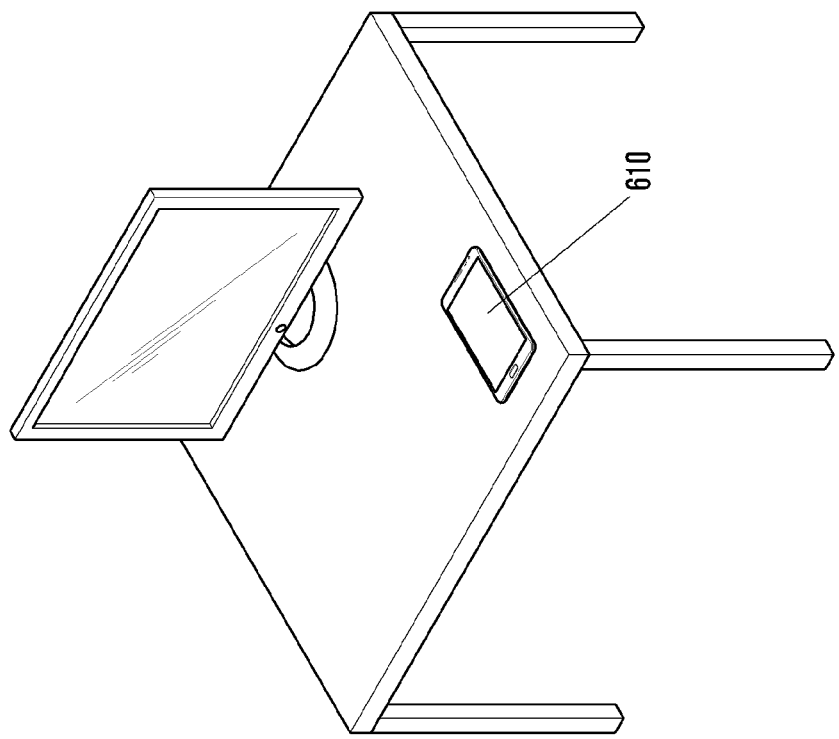

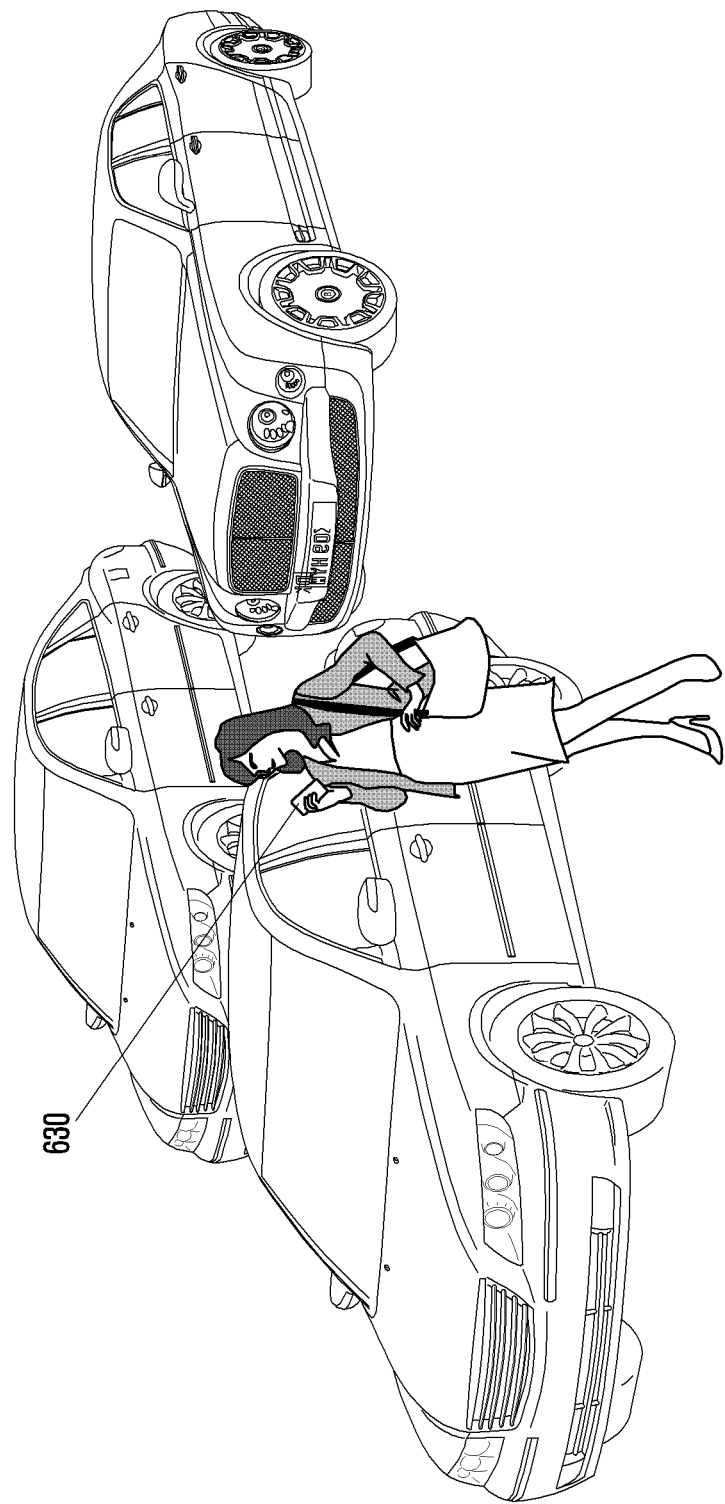

APPARATUS AND METHOD FOR PROCESSING MISSED CALL

CROSS-REFERENCE TO RELATED APPLICATION(S)

This application claims the benefit under 35 U.S.C. §119(a) of a Korean patent application filed on Mar. 19, 2014 in the Korean Intellectual Property Office and assigned Serial No. 10-2014-0032074, the entire disclosure of which is hereby incorporated by reference.

TECHNICAL FIELD

The present disclosure relates to a scheme of processing a missed call.

BACKGROUND

With functionality advanced, recent mobile electronic devices have outgrown their traditional services such as a voice call or a text message transmission and now offer various services based on wireless internet technology or the like.

Additionally, mobile electronic devices now offer a great variety of user-friendly functions. For example, when an incoming call arrives, a mobile electronic device changes the volume of a ringtone by degrees or outputs the ringtone together with vibrations in case a user is unable to hear a ringtone.

If an incoming call is not connected within a given time, a mobile electronic device displays an indication of a missed call on a wallpaper or in a call log list. However, this often causes an inconvenience to a user since the user is able to recognize a missed call only when seeing the wallpaper or opening the call log list.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for processing a missed call so that a call notification can be maintained in the same form as used when the missed call is received. This allows a user to recognize all missed calls instantly and easily.

In accordance with an aspect of the present disclosure, a method for processing a missed call at an electronic device is provided. The method includes checking whether an incoming call received through a communication network is connected, detecting, if the incoming call is not connected, whether the incoming call is terminated, and maintaining, if the incoming call is terminated, a call notification in the same form as used when the incoming call is received.

In accordance with another aspect of the present disclosure, an electronic device is provided. The electronic device includes a communication module configured to receive an incoming call through a communication network, and a control module configured to check whether the incoming call is connected, to detect, if the incoming call is not connected, whether the incoming call is terminated, and to maintain, if the incoming call is terminated, a call notification in the same form as used when the incoming call is received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B are screenshots illustrating examples of displaying a call notification screen in accordance with various embodiments of the present disclosure.

FIGS. 6A and 6B are views illustrating examples of outputting a call notification in accordance with various embodiments of the present disclosure.

Throughout the drawings, it should be noted that like reference numbers are used to depict the same or similar elements, features, and structures.

DETAILED DESCRIPTION

Figure 1:
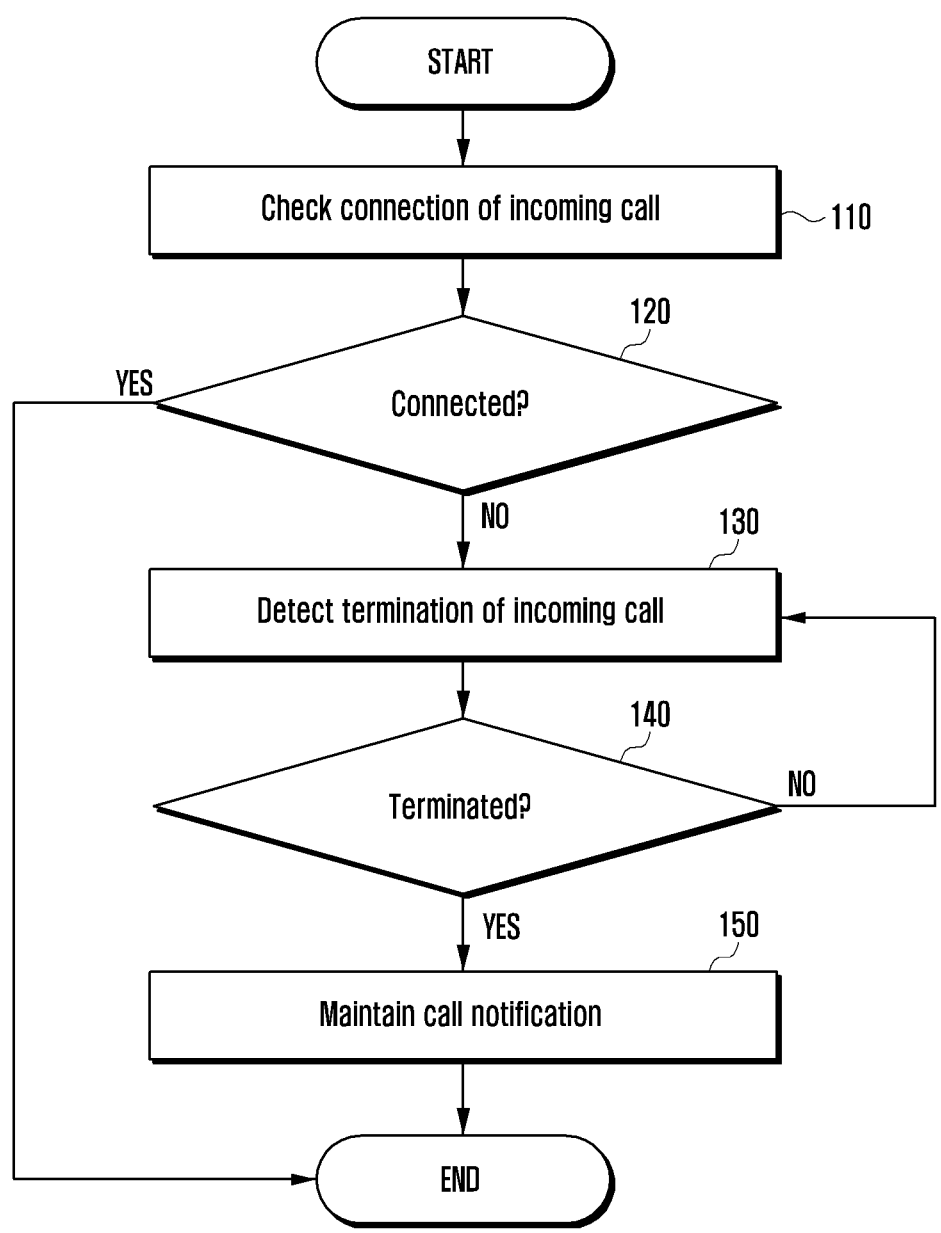
FIG. 1 is a flow diagram illustrating a method for processing a missed call in accordance with various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to some embodiments, an electronic device may be any type of device which has a communication function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a portable medical device, a digital camera, or a wearable device (e.g., an Head-Mounted Device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a Digital Video Disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), an Flight Data Recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this present disclosure.

FIG. 1 is a flow diagram illustrating a method for processing a missed call in accordance with various embodiments of the present disclosure. This method may be implemented at an electronic device.

Referring to FIG. 1, at operation 110, the electronic device may check a connection of an incoming call. For example, the electronic device may receive an incoming call from another electronic device through a communication network. The received incoming call may be displayed on a screen of the electronic device. When a user sees the screen and desires to receive a call, a connection of the incoming call may be established. However, in case the user fails to see the screen or does not desire to receive the call, no connection may be made.

At operation 120, the electronic device may determine whether an incoming call is connected or not. If the incoming call is connected, a process is ended since there is no need to maintain a call notification.

If the incoming call is not connected, the electronic device may detect the termination of the incoming call at operation 130.

At operation 140, the electronic device may determine whether the incoming call is terminated without connection.

If the incoming call is terminated (namely, in case the incoming call is recognized as a missed call), the electronic device maintains a call notification in the same form as used when the incoming call is received at operation 150. Here, the form of a call notification refers to displaying an indication of an incoming call on a screen of the electronic device and outputting at least one of a ringtone, a vibration, and a mute sound.

According to some embodiments, a method for processing a missed call at an electronic device includes checking whether an incoming call received through a communication network is connected, detecting, if the incoming call is not connected, whether the incoming call is terminated, and maintaining, if the incoming call is terminated, a call notification in the same form as used when the incoming call is received.

The maintaining of the call notification may include displaying, on a display module, the same call notification screen as displayed when the incoming call is received.

The displaying may include displaying one or more call notification screens when one or more of the incoming calls are received.

The displaying may include displaying, based on a setting of the electronic device, the call notification screen associated with at least one of a selected number of incoming calls, recent incoming calls, and specific numbers of incoming calls selected from the recent incoming calls.

The displaying may include, if an actual call is connected through the communication network while the call notification screen for a missed call is displayed, distinctively displaying both a call notification screen for the actual call and the call notification screen for the missed call.

The maintaining of the call notification may include outputting, based on a setting of the electronic device, at least one of a ringtone, a vibration, and a mute sound which is the same output as used when the incoming call is received.

The outputting may include outputting light through an illumination unit in case of the mute sound.

The outputting may include obtaining an angle or motion of the electronic device using a sensor, and outputting, based on the obtained angle or motion, at least one of the ringtone, the vibration, and the mute sound.

The outputting may include detecting an ambient noise level of the electronic device using a sensor, and outputting, based on the detected noise level, at least one of the ringtone, the vibration, and the mute sound.

The maintaining may include maintaining, based on setting of the electronic device, the call notification associated with the incoming call from at least one of all phone numbers, stored phone numbers, selected phone numbers, blocked phone numbers, and non-blocked phone numbers.

The maintaining may include maintaining, based on setting of the electronic device, the call notification at least one of in a selected time zone, at every time except a specific time zone, and at all times.

The maintaining may include maintaining the call notification associated with the incoming call from a selected phone number received in a selected time zone.

The method may further include setting a notification interval associated with the call notification or a type of a ringtone.

The method may further include, when a call button displayed with the call notification is selected, trying to connect a call with a phone number of the incoming call.

The trying to connect the call may include notifying that a call connection will incur a call charge.

Figure 2:
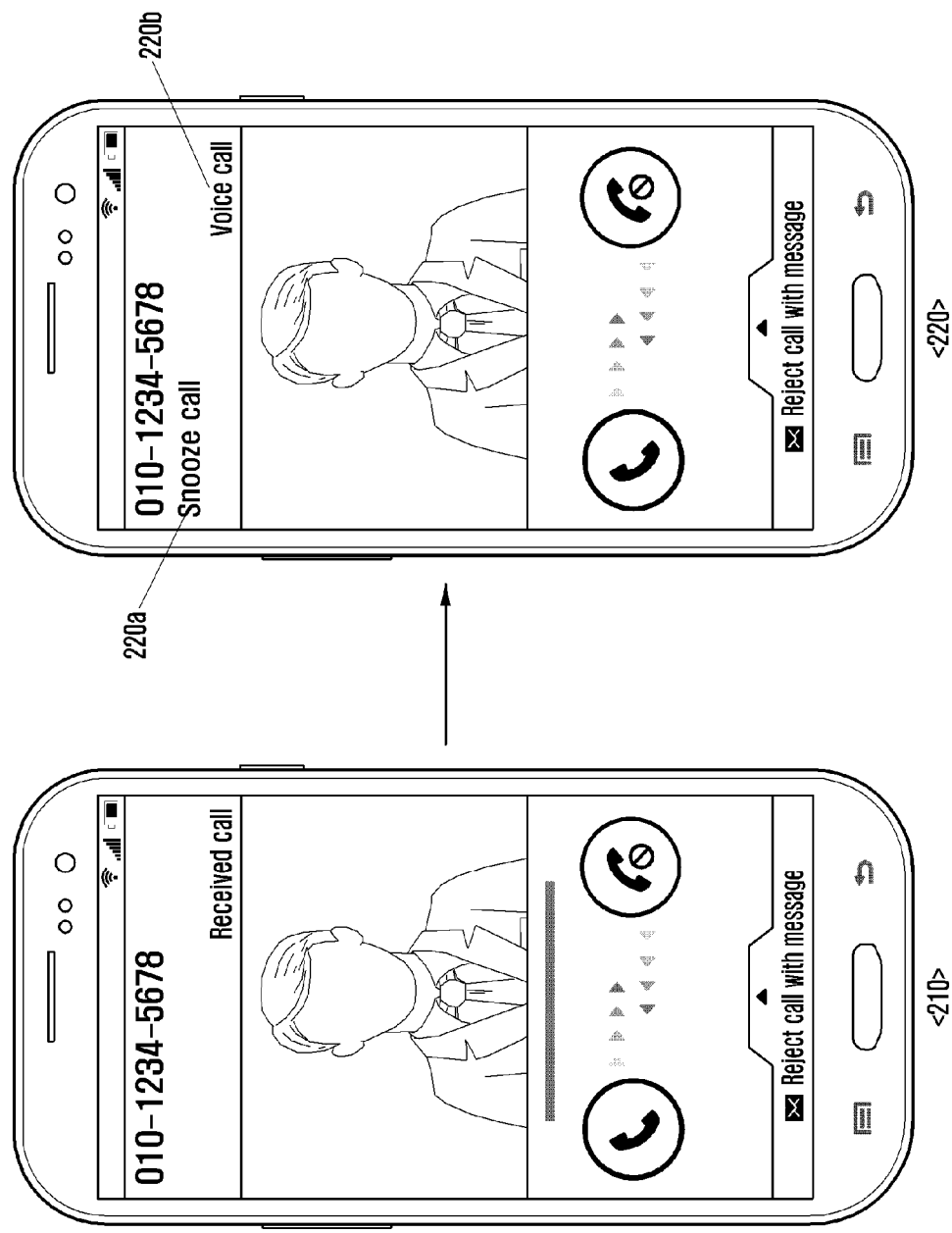
FIG. 2 is a screenshot illustrating an example of maintaining a call notification in accordance with various embodiments of the present disclosure.

FIG. 2 is a screenshot illustrating an example of maintaining a call notification in accordance with various embodiments of the present disclosure.

Referring to FIG. 2, when an incoming call is received, the electronic device may notify that the incoming call is received by displaying a phone number of the incoming call (e.g., 010-1234-5678) on a call notification screen as shown in a screenshot 210 and by outputting an associated ringtone. If any image associated with the incoming call has already been stored in the electronic device, the screen may further display thereon the stored image. Normally, for a given time (e.g., for seventy seconds), the call notification screen is displayed and the ringtone is outputted. If the incoming call is not connected, an indication of a missed call is typically displayed on wallpaper or in a call log list. In this typical case, a user may fail to recognize a missed call until he or she sees the wallpaper or opens the call log list.

However, as shown in a screenshot 220, the electronic device of the present disclosure may display, through the display module, a call notification screen which is the same screen that is displayed when the incoming call is received. At this time, the electronic device may display a snooze call indication 220a for indicating a missed call together with a voice call indication 220b so that the call notification screen can be distinguished from an actual call notification screen.

According to various embodiments of the present disclosure, depending on a user's setting, the electronic device may determine whether to use "a snooze call service" for displaying a call notification screen.

According to various embodiments of the present disclosure, the electronic device may receive a user's input for setting at least one of the number of call notification screens to be displayed, target phone numbers for a call notification, and an available time zone for a call notification. Alternatively or additionally, the electronic device may have default values of the above setting items.

Figure 3:
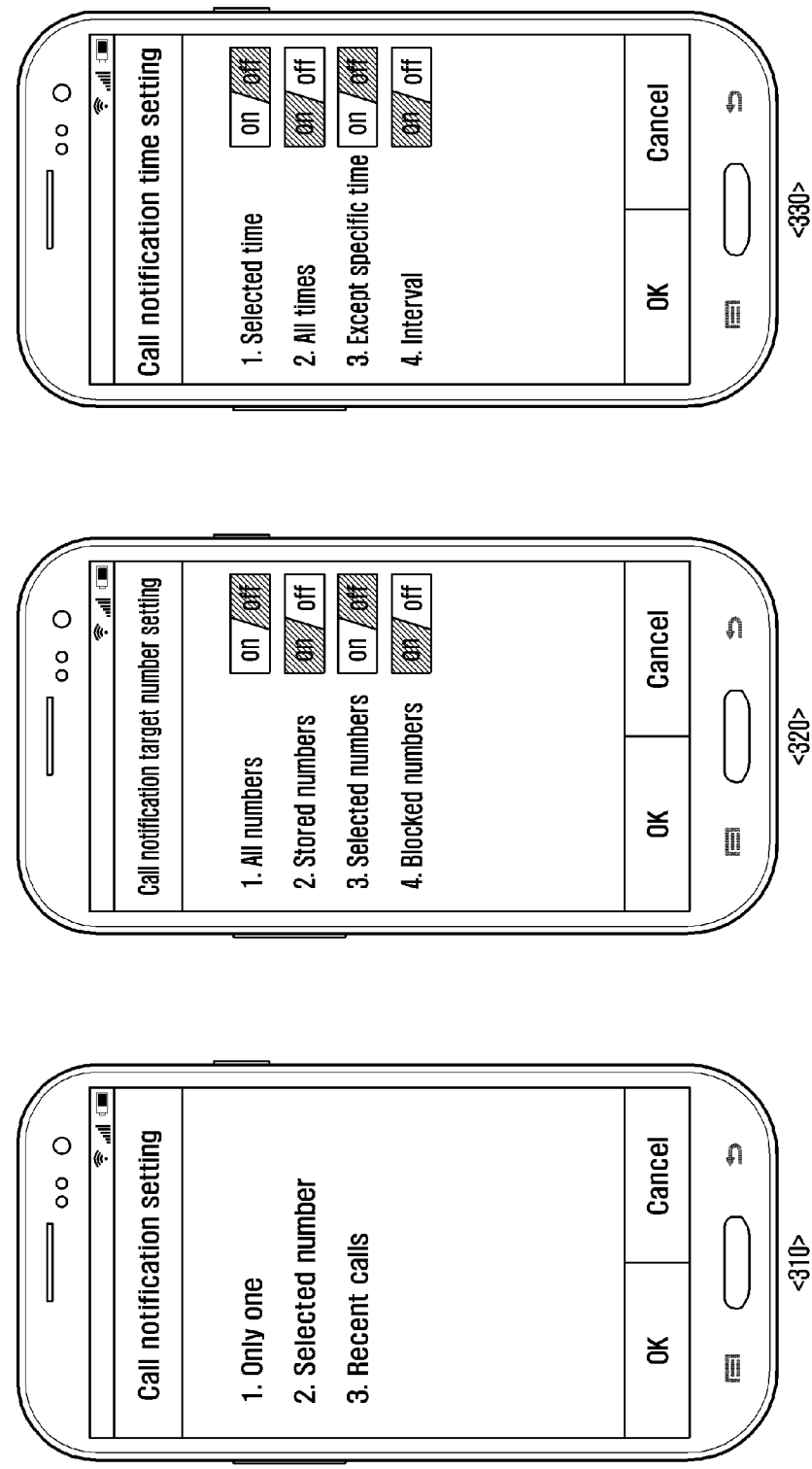
FIG. 3 is a screenshot illustrating an example of setting a call notification in accordance with various embodiments of the present disclosure.

FIG. 3 is a screenshot illustrating an example of setting a call notification in accordance with various embodiments of the present disclosure.

Referring to FIG. 3, a screenshot 310 illustrates an example of setting the number of call notification screens to be displayed. For example, in case one or more incoming calls are received, the electronic device may display only one call notification screen, predetermined numbers of call notification screens, or call notification screens contained in recent incoming calls. In an embodiment, the electronic device may display a selected number of call notification screens (e.g., one, two, etc.), call notification screens of recent incoming calls, or call notification screens selected from recent incoming calls. Here, recent incoming calls may be missed calls that occur for a given time (e.g., one hour, three hours, six hours, etc.) set by a user or set as a default value by the electronic device. In case there are five or more recent incoming calls, only a selected number of calls (e.g., two or three calls) may become a target for a call notification.

A screenshot 320 illustrates an example of setting target phone numbers for displaying a call notification screen. For example, the electronic device may set a call notification screen to be displayed with regard to incoming calls from at least one of all numbers, specific numbers stored in a phonebook, selected numbers, and blocked numbers (or alternatively non-blocked numbers). Target phone numbers may be set by a user or set as a default value by the electronic device.

A screenshot 330 illustrates an example of setting an available time zone for displaying a call notification screen. For example, the electronic device may set a call notification screen to be displayed at least one of in a selected time zone, at every time except a specific time zone, and at all times. Such a time zone may be set by a user or set as a default value by the electronic device. Additionally, the electronic device may set a notification interval for displaying a call notification screen.

In some embodiments, the electronic device may set a call notification to be maintained with regard to an incoming call from a selected phone number received in a selected time zone.

FIGS. 4A and 4B are screenshots illustrating examples of displaying a call notification screen in accordance with various embodiments of the present disclosure.

Referring to FIG. 4A, a screenshot 410 illustrates an example of displaying one or more call notification screens when one or more incoming calls are received. As shown, in case of two incoming calls, the electronic device may display separately the first call notification screen 410a indicating one incoming call (e.g., received from "010-1234-5678") and the second call notification screen 410b indicating another incoming call (e.g., received from "010-9999-8888").

A screenshot 420 illustrates an example of displaying call notification screens associated with recent incoming calls in the order of time. As shown, in case the number of recent incoming calls is three, the electronic device may display the first call notification screen 420a of the most recent incoming call (e.g., received from "010-1234-5678" at 6:25 p.m.), the second call notification screen 420b of the next recent incoming call (e.g., received from "010-9999-8888" at 5:48 p.m.), and the third call notification screen 420c of the further next recent incoming call (e.g., received from "010-2580-1234" at 3:00 p.m.).

Referring to FIG. 4B, if a call is actually connected through a communication network during a display of a call notification screen, the electronic device may display distinctively both an actual call notification screen and the existing call notification screen as shown in a screenshot 430 or 440. For example, the screenshot 430 illustrates one example in which an actual call notification screen 430a is displayed at an upper portion and a call notification screen 430b associated with a missed call is displayed at a lower portion. Further, the actual call notification screen 430a may display thereon "actual call", and the call notification screen 430b may display thereon "snooze call" associated with a missed call.

Additionally, the electronic device may selectively display graphical effects or highlights to an actual call notification screen 440a. For example, a screenshot 440 illustrates one example in which the actual call notification screen 430a is displayed to flicker and a call notification screen 440b of a missed call is displayed without any graphical effect.

In some embodiments, the electronic device may output at least one of a ringtone, a vibration, and a mute sound in the same form as outputted when an incoming call is received.

Figure 5:
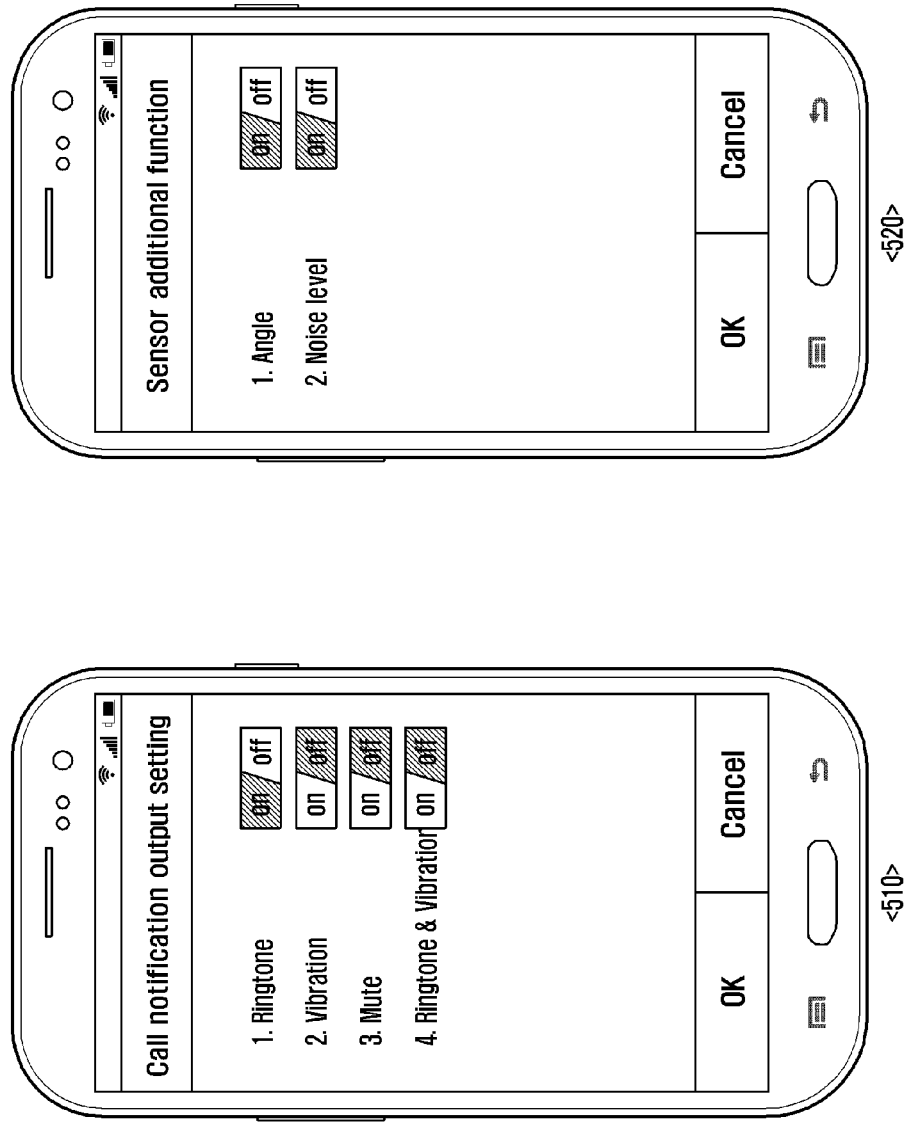
FIG. 5 is a screenshot illustrating an example of setting a call notification output in accordance with various embodiments of the present disclosure.

FIG. 5 is a screenshot illustrating an example of setting a call notification output in accordance with various embodiments of the present disclosure.

Referring to FIG. 5, a screenshot 510 illustrates an example of setting an output sound to be used when a call notification is maintained. As shown, this output sound may be set to at least one of a ringtone, a vibration, a mute sound, and a combination of ringtone and vibration. The output sound may be set by a user or set as a default value by the electronic device. In case the output sound is a mute sound, the electronic device may output light through an illumination unit. Therefore, the electronic device may not only visually display a call notification on the screen, but also output a call notification by means of at least one of sound, vibration and light. In case of sound, the electronic device may allow a user to set types of ringtone.

A screenshot 520 illustrates an example of setting an additional sensor function in connection with an output sound to be used when a call notification is maintained. Whether to use an output sound based on sensor values may be set by a user or set as a default value by the electronic device. For example, the electronic device may obtain an angle of the electronic device using a sensor and, based on the obtained angle, may output at least one of a ringtone, a vibration and a mute sound. Similarly, the electronic device may detect an ambient noise level of the electronic device using a sensor and, based on the detected noise level, may output at least one of a ringtone, a vibration and a mute sound.

FIGS. 6A and 6B are views illustrating examples of outputting a call notification in accordance with various embodiments of the present disclosure.

Referring to FIG. 6A, a reference numeral 610 illustrates an example of outputting a vibration when an electronic device is maintained level within a given range from a horizontal plane. For example, it may be assumed that the electronic device is placed on a desk or floor. In this case, since an angle obtained from a sensor falls within a given range from a horizontal plane, the electronic device may be regarded as being in a horizontal position. Further, judging that a user does not hold the electronic device, the electronic device may output a vibration rather than a sound.

A reference numeral 620 illustrates an example of outputting at least one of a ringtone, a vibration, a combination of ringtone and vibration, and a mute sound with light when an angle obtained from a sensor is not level or when any motion is detected. For example, if the electronic device is not in a horizontal position or if any motion is detected, it may be determined that a user holds the electronic device. Then the electronic device may output a ringtone or a combination of ringtone and vibration.

Referring to FIG. 6B, a reference numeral 630 illustrates an example of detecting an ambient noise level of an electronic device using a sensor and then outputting at least one of a ringtone, a vibration and a mute sound according to the detected noise level. For example, when a user having the electronic device walks along the street, he or she may often fail to hear a ringtone due to a high ambient noise level. In this case, the electronic device may output a call notification with tactile feedback such as a vibration, a combination of ringtone and vibration, and a combination of light and vibration.

Figure 7:
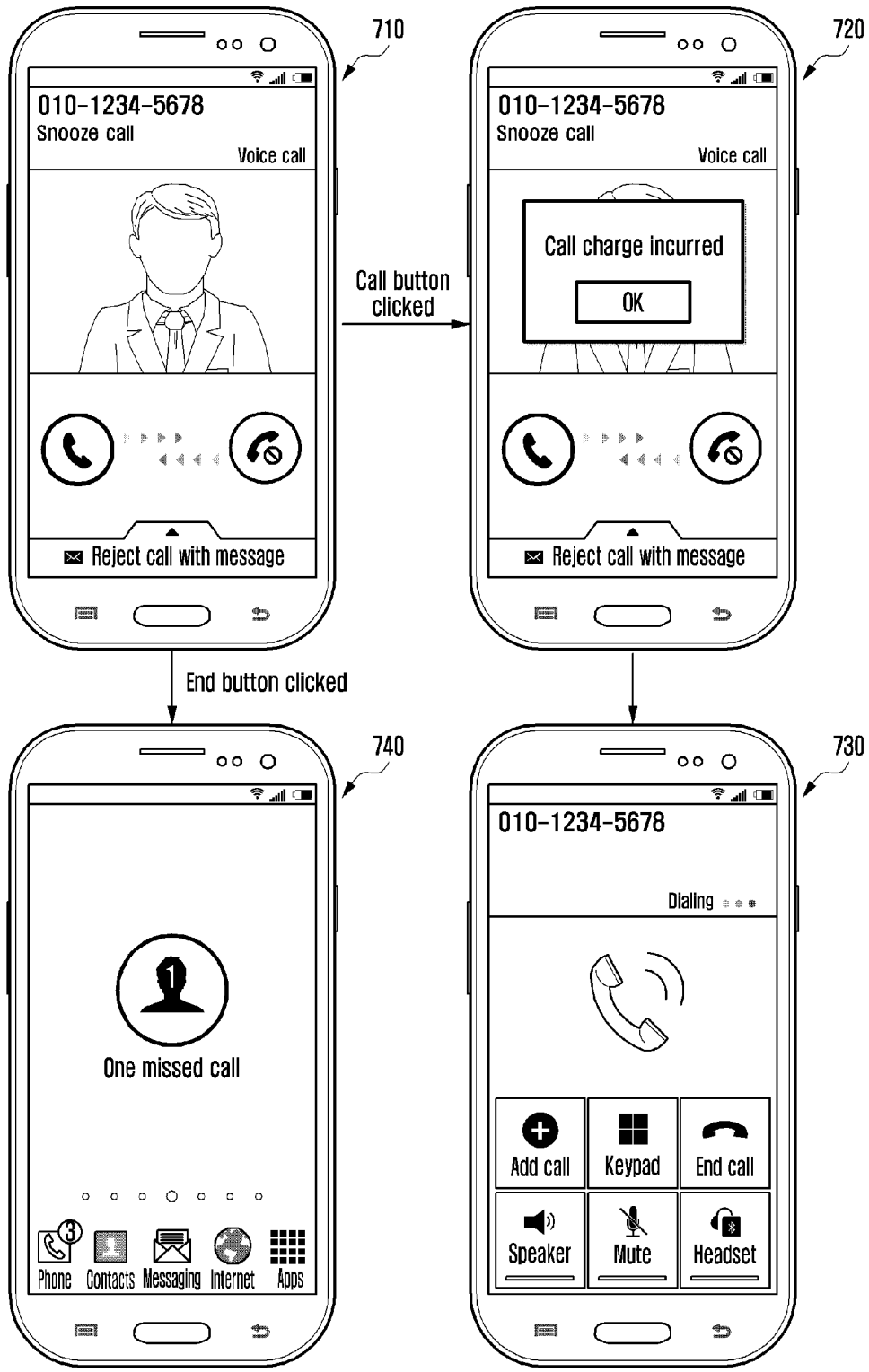
FIG. 7 is a screenshot illustrating an example of connecting a call through a call notification screen in accordance with various embodiments of the present disclosure.

FIG. 7 is a screenshot illustrating an example of connecting a call through a call notification screen in accordance with various embodiments of the present disclosure.

Referring to FIG. 7, as shown in a screenshot 710, a call notification screen displayed on the electronic device may contain a call button and an end button as if an actual call is received. When the call button is selected on the call notification screen, the electronic device may try to connect a call with a phone number (e.g., 010-1234-5678) of a missed call as shown in a screenshot 730. Optionally, as shown in a screenshot 720, it may be notified that a call connection will incur a call charge. In this case, a call connection as shown in a screenshot 730 may be tried when a user selects the OK button on a screenshot 720. Meanwhile, when the end button is selected on the call notification screen, the electronic device may regard it as call-blocking and process it as a normal missed call as shown in a screenshot 740. Then the electronic device may not display a call notification screen with regard to the blocked number.

Figure 8:
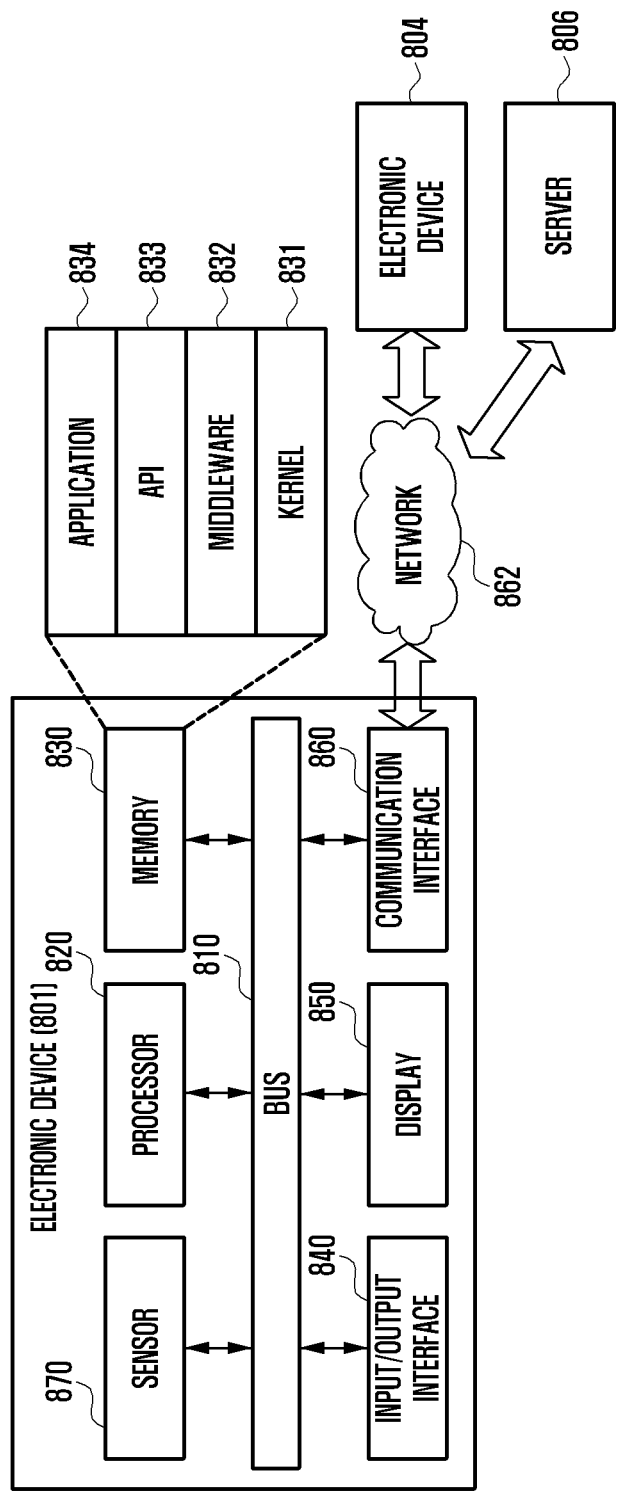
FIG. 8 is a block diagram illustrating a network environment including an electronic device in accordance with various embodiments of the present disclosure.

FIG. 8 is a block diagram illustrating a network environment including an electronic device according to an embodiment of the present disclosure.

Referring to FIG. 8, the electronic device 801 may include a bus 810, a processor 820, a memory 830, an input/output interface 840, a display 850, a communication interface 860, and an sensor 870.

The bus 810 may be a circuit that connects the aforementioned elements and facilitates communication (for example, a control message) between the aforementioned elements.

The processor 820 may receive instructions from the aforementioned other elements (for example, the memory 830, the input/output interface 840, the display 850, the communication interface 860, and the sensor 870) through the bus 810 and decode the received instructions to perform a calculation or process data according to the decoded instructions.

The memory 830 may store instructions or data received from or generated by the processor 820 or the other elements (for example, the input/output interface 840, the display 850, the communication interface 860, and the sensor 870). The memory 830 may include programming modules, such as a kernel 831, a middle ware 832, an Application Programming Interface (API) 833, and applications 834. Each of the programming modules described above may be constituted by software, firmware, and hardware, or a combination of at least two thereof.

The kernel 831 may control or manage system resources (for example, the bus 810, the processor 820, and the memory 830) which are used to execute an operation or a function implemented in the remaining other programming modules, for example, the middle ware 832, the API 833, and the applications 834. In addition, the kernel 831 may provide an interface that enables the middle ware 832, the API 833, or the applications 834 to access individual elements of the electronic device 801 for control or management thereof.

The middle ware 832 may function as a relay for allowing the API 833 or the applications 834 to exchange data by communicating with the kernel 831. Furthermore, in regard to task requests received from the applications 834, the middleware 832 may perform a control (for example, scheduling or load balancing) for the task requests, by using a method of assigning, to at least one of the applications 834, a priority for using the system resources (for example, the bus 810, the processor 820, and the memory 830) of the electronic device 801.

The API 833 is an interface through which the applications 834 control functions provided by the kernel 831 and the middleware 832, and may include at least one interface or function (for example, instruction) for file control, window control, image processing, or text control.

According to various embodiments, the applications 834 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing an atmospheric pressure, humidity, temperature, and the like). Additionally or alternately, the applications 834 may include an application related to an information exchange between the electronic device 801 and an external electronic device (for example, an electronic device 804). The application related to the information exchange may include, for example, a notification relay application for transferring specific information to the external electronic device, or a device management application for managing the external electronic device.

For example, the notification relay application may include a function of transferring, to the external electronic device (for example, the electronic device 804), notification information generated from other applications of the electronic device 801 (for example, an SMS/MMS application, an e-mail application, a health management application, an environmental information application, and the like). Additionally or alternatively, the notification relay application may receive the notification information from, for example, the external electronic device (for example, the electronic device 804) and provide the received notification information to a user. The device management application may manage (for example, install, delete, or update), for example, at least some functions of the external electronic device (for example, the electronic device 804) communicating with the electronic device 801 (for example, turning on/off the external electronic device itself (or some elements thereof) or adjusting brightness (or resolution) of a display), applications operating in the external electronic device, or services provided from the external electronic device (for example, a telephone call service or a message service).

According to various embodiments, the applications 834 may include an application designated depending upon an attribute (for example, a type) of the external electronic device (for example, the electronic device 804). For example, in a case where the external electronic device is an MP3 player, the applications 834 may include an application related to the reproduction of music. Similarly, in a case where the external electronic device is a mobile medical appliance, the applications 834 may include an application related to health care. According to an embodiment, the applications 834 may include at least one of an application designated to the electronic device 801 and an application received from the external electronic device (for example, a server 806 or the electronic device 804).

The input/output interface 840 may transfer instructions or data, input from a user through an input/output device (for example, a sensor, a keyboard, or a touch screen), to the processor 820, the memory 830, the communication interface 860, or the sensor 870 through, for example, the bus 810. For example, the input/output interface 840 may provide, to the processor 820, data for a user's touch input through the touch screen. Furthermore, through the input/output device (for example, a speaker or a display), the input/output interface 840 may output instructions or data received from the processor 820, the memory 830, the communication interface 860, or the sensor 870 through the bus 810. For example, the input/output interface 840 may output voice data, processed through the processor 820, to a user through a speaker.

The display 850 may display various types of information (for example, multimedia data or text data) to a user.

The communication interface 860 may connect communication between the electronic device 801 and the external electronic device (for example, the electronic device 804 or the server 806). For example, the communication interface 860 may be connected to a network 862 through wireless or wired communication to communicate with the external device. The wireless communication may include at least one of, for example, Wi-Fi, Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like). The wired communication may include at least one of, for example, a Universal Serial Bus (USB), a High Definition Multimedia Interface (HDMI), Recommended Standard 1032 (RS-1032), and a Plain Old Telephone Service (POTS).

According to an embodiment, the network 862 may be a telecommunication network. The communication network may include at least one of a computer network, the Internet, the Internet of things, and a telephone network. According to an embodiment, a protocol (for example, a transport layer protocol, data link layer protocol, or a physical layer protocol) for communication between the electronic device 801 and the external device may be supported by at least one of the applications 834, the application programming interface 833, the middleware 832, the kernel 831, and the communication interface 860.

The sensor 870 may process at least some pieces of information acquired from the other elements (for example, the processor 820, the memory 830, the input/output interface 840, and the communication interface 860), and may provide the processed information to a user through various methods. For example, the sensor 870 may recognize information on connection components included in the electronic device 801, store the information on the connection components in the memory 830, and execute the applications 834 based on the information on the connection components.

Figure 9:
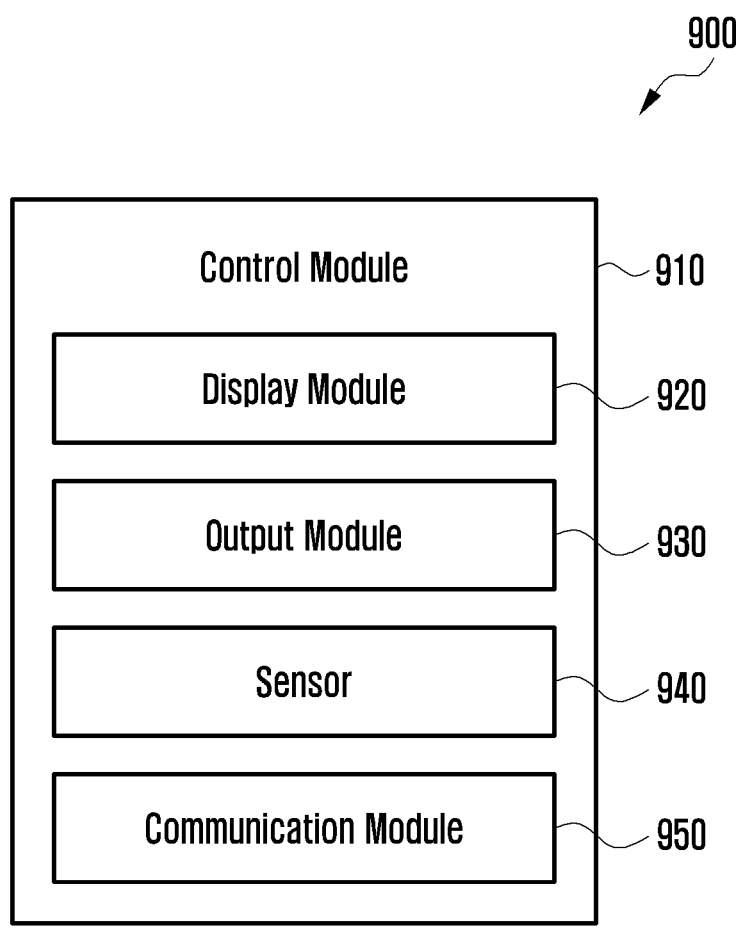
FIGS. 9 and 10 are block diagrams illustrating an electronic device in accordance with various embodiments of the present disclosure.

FIG. 9 is a block diagram illustrating an electronic device in accordance with various embodiments of the present disclosure.

Referring to FIG. 9, the electronic device 900 may include, but is not limited to, a control module 910, a display module 920, an output module 930, a sensor 940, and a communication module 950.

The communication module 950 receives an incoming call through a communication network. The communication module 950 performs a voice call, a video call, or a data communication with any external device through a network under the control of the control module 910. The communication module 950 includes therein a radio frequency (RF) transmitter to up-convert the frequency of an outgoing signal and to amplify the up-converted signal, and an RF receiver to low-noise-amplify an incoming signal and to down-convert the frequency of the amplified signal. Also, the communication module 950 may include therein a mobile communication module (e.g., a 3rd generation mobile communication module, a 3.5th generation mobile communication module, a 4th generation mobile communication module, etc.), a digital broadcasting module (e.g., a DMB module), and a short range communication module (e.g., a WiFi module, a Bluetooth module, an NFC module).

The control module 910 checks whether an incoming call is connected or not. If the incoming call is not connected, the control module 910 further checks whether the incoming call is terminated without connection. If the incoming call is terminated, the control module 910 recognizes it as a missed call and maintains a call notification in the same form as used when the incoming call is received.

The display module 920 may display thereon a call notification screen which is the same screen that is displayed when an incoming call is received. According to some embodiments, in case one or more incoming calls are received, the display module 920 may display thereon at least one call notification screen associated with selected numbers of incoming calls, recent incoming calls, and/or specific numbers of incoming calls selected from recent incoming calls. According to some embodiments, if a call is actually connected through a communication network during a display of a call notification screen, the display module 920 may distinctively display thereon both a call notification screen for an actual call and a call notification screen for a missed call.

Additionally, the display module 920 displays thereon at least one image (or any other graphical element) under the control of the control module 910. Namely, the control module 910 processes (e.g., decodes) data to an image or any other graphical element and stores it in a buffer, and then the display module 920 converts the image stored in the buffer into an analog signal and displays it on the screen. The display module 920 may be formed of a liquid crystal display (LCD), an organic light emitting diode (OLED), an active matrix OLED (AMOLED), or a flexible display. Also, the display module 920 may be offered to form a touch screen. In some embodiments, under the control of the control module 910, the display module 920 may display information about a device found by a search, display a symbol indicating a communication type available for a connection with the displayed device, and image information associated with an application or function linked to the displayed device.

The output module 930 may output at least one of a ringtone, a vibration, and a mute sound, which is the same output as used when an incoming call is received. For this, the output module 930 may include a speaker for outputting a ringtone, a vibration unit for outputting a vibration, and an illumination unit for outputting light. In case of a mute sound, the illumination unit may output light.

According to some embodiments, the sensor 940 may obtain an angle or motion of the electronic device 900. Based on this angle or motion and under the control of the control module 910, the output module 930 may output at least one of a ringtone, a vibration and a mute sound. According to some embodiments, the sensor 940 may detect an ambient noise level of the electronic device 900. Based on this noise level and under the control of the control module 910, the output module 930 may output at least one of a ringtone, a vibration and a mute sound.

The output module 930 may be an audio processing unit, which may output a sound under the control of the control module 910. Normally, the audio processing unit is combined with a speaker and a microphone and performs the input and output of audio signals (e.g., voice data) for voice recognition, voice recording, digital recording, a call, or the like. Also, the audio processing unit receives audio signals from the control module 910, converts the received audio signals into analog signals through digital-to-analog conversion, amplifies the analog signals, and outputs the amplified signals to the speaker. The speaker converts the received audio signals into sound waves and outputs them. The microphone converts sound waves obtained from a person or any other sound source into audio signals.

According to some embodiments, the control module 910 may set a call notification to be maintained with regard to incoming calls from at least one of all numbers, stored numbers, selected numbers, and blocked numbers (or alternatively non-blocked numbers). Also, the control module 910 may set a call notification to be maintained at least one of in a selected time zone, at every time except a specific time zone, and at all times. Further, the control module 910 may set a notification interval associated with a call notification and/or set a type of a ringtone.

According to some embodiments, when a call button is selected on a call notification screen, the communication module 950 may try to connect a call with a phone number of a missed call. At this time, the control module 910 may notify that a call connection will incur a call charge.

Meanwhile, the electronic device of the present disclosure may further include other elements in addition to the above-discussed elements. For example, the electronic device may further include a memory.

Figure 10:
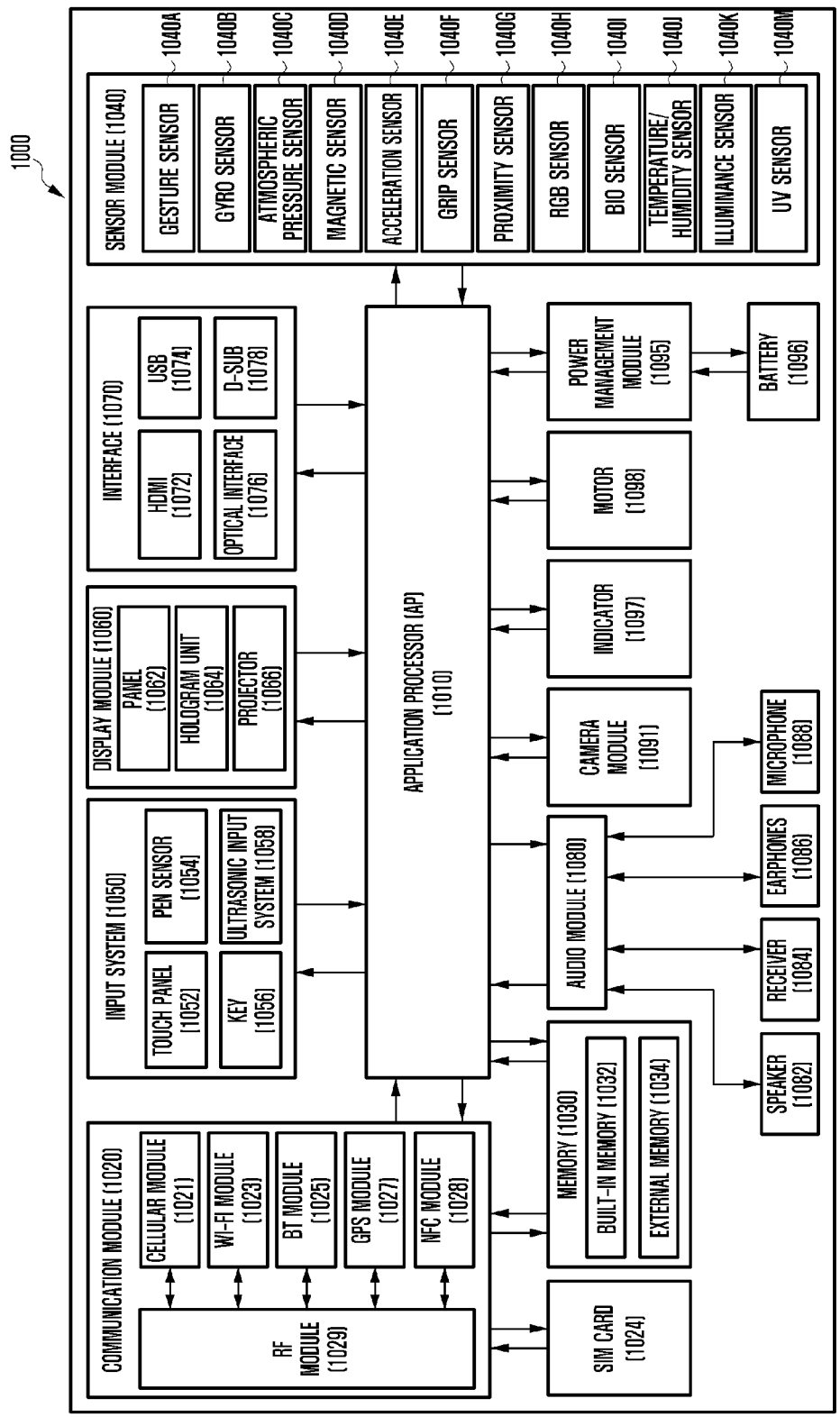

FIG. 10 is a block diagram of an electronic device according to various embodiments of the present disclosure. The electronic device of FIG. 10 may include, for example, all or some of the electronic device 801 illustrated in FIG. 8.

Referring to FIG. 10, the electronic device 1000 may include at least one Application Processor (AP) 1010, a communication module 1020, a Subscriber Identification Module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may control a plurality of hardware or software components connected to the AP 1010 by driving an operating system or an application program, process various types of data including multimedia data, and perform calculations. The AP 1010 may be implemented by, for example, a System on Chip (SoC). According to an embodiment, the AP 1010 may further include a Graphic Processing Unit (GPU, not illustrated).

The communication module 1020 (for example, the communication interface 860) may perform data transmission/reception in communication between the electronic device 1000 (for example, the electronic device 801 in FIG. 8) and other electronic devices (for example, the electronic device 804 and the server 806 in FIG. 8) connected thereto through a network. According to one embodiment, the communication module 1020 may include a cellular module 1021, a Wi-Fi module 1023, a BT module 1025, a GPS module 1027, an NFC module 1028, and a RF module 1029.

The cellular module 1021 may provide a voice call, a video call, SMS, or an Internet service through a communication network (for example, LTE, LTE-A, CDMA, WCDMA, UMTS, WiBro, or GSM). Furthermore, the cellular module 1021 may distinguish and authenticate electronic devices within a communication network using a subscriber identification module (for example, the SIM card 1024). According to one embodiment, the cellular module 1021 may perform at least some functions which the AP 1010 may provide. For example, the cellular module 1021 may perform at least some of the multimedia control function.

According to an embodiment, the cellular module 1021 may include a Communication Processor (CP). For example, the cellular module 1021 may be implemented as an SoC. Although the elements such as the cellular module 1021 (for example, a communication processor), the memory 1030, and the power management module 1095 are illustrated to be separate from the AP 1010 in FIG. 10, the AP 1010 may include at least some of the aforementioned elements (for example, the cellular module 1021) according to an embodiment.

According to an embodiment, the AP 1010 or the cellular module 1021 (for example, communication processor) may load instructions or data, received from a non-volatile memory or at least one of the other elements connected thereto, to a volatile memory and process the loaded instructions or data. Furthermore, the AP 1010 or the cellular module 1021 may store data received from or generated by at least one of the other elements in a non-volatile memory. The AP 1010 and/or the cellular module 1021 may constitute the entire or a part of the processor 820 described above with reference to FIG. 8.

For example, the Wi-Fi module 1023, the BT module 1025, the GPS module 1027, and the NFC module 1028 may include a processor for processing data transmitted/received through the corresponding module.

Although the cellular module 1021, the Wi-Fi module 1023, the BT module 1025, the GPS module 1027, and the NFC module 1028 are illustrated as individual blocks in FIG. 10, at least some (for example, two or more) of the cellular module 1021, the Wi-Fi module 1023, the BT module 1025, the GPS module 1027, and the NFC module 1028 may be included within one Integrated Chip (IC) or one IC package according to one embodiment. For example, at least some (for example, the communication processor corresponding to the cellular module 1021 and the Wi-Fi processor corresponding to the Wi-Fi module 1023) of processors corresponding to the cellular module 1021, the Wi-Fi module 1023, the BT module 1025, the GPS module 1027, and the NFC module 1028 may be implemented as one SoC.

The RF module 1029 may transmit/receive data, for example, an RF signal. For example, the RF module 1029 may include a transceiver, a Power Amp Module (PAM), a frequency filter, a Low Noise Amplifier (LNA), or the like. For example, the RF module 1029 may further include a component conductor or a conductive wire for transmitting/receiving an electromagnetic wave in a free space in wireless communication. Although the cellular module 1021, the Wi-Fi module 1023, the BT module 1025, the GPS module 1027, and the NFC module 1028 share one RF module 1029 in FIG. 10, at least one of the cellular module 1021, the Wi-Fi module 1023, the BT module 1025, the GPS module 1027, and the NFC module 1028 may transmit/receive an RF signal through a separate RF module according to one embodiment.

The SIM cards 1024 may be a card including a subscriber identification module and may be inserted into slots formed in particular positions of the electronic device 1000. The SIM cards 1024 may include unique identification information (for example, an integrated circuit card identifier (IC-CID)) or subscriber information (for example, an international mobile subscriber identity (IMSI)).

The memory 1030 (for example, the memory 830 of FIG. 8) may include an internal memory 1032 or an external memory 1034. The internal memory 1032 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 1032 may be a Solid State Drive (SSD). The external memory 1034 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 1034 may be functionally connected to the electronic device 1000 through various interfaces. According to an embodiment, the electronic device 1000 may further include a storage device (or storage medium) such as a hard disc drive.

The sensor module 1040 may measure a physical quantity or detect an operating state of the electronic device 1000 and convert the measured or detected information to an electronic signal. For example, the sensor module 1040 may include at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (for example, a Red/Green/Blue (RGB) sensor), a bio-sensor 1040I, a temperature/humidity sensor 1040J, an illumination sensor 1040K, and an Ultra Violet (UV) sensor 1040M. Additionally or alternatively, the sensor module 1040 may include an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor (not illustrated), an iris sensor (not illustrated), a fingerprint sensor (not illustrated), and the like. The sensor module 1040 may further include a control circuit for controlling one or more sensors included therein.

The input device 1050 may include a touch panel 1052, a pen sensor 1054, a key 1056, or an ultrasonic input device 1058. For example, the touch panel 1052 may recognize a touch input through at least one of a capacitive type, a resistive type, an infrared type, and an acoustic wave type. The touch panel 1052 may further include a control circuit. The capacitive type touch panel may recognize physical contact or proximity. The touch panel 1052 may further include a tactile layer. In this case, the touch panel 1052 may provide a user with a tactile reaction.

For example, the pen sensor 1054 may be implemented by using the same or similar method to receiving a user's touch input or by using a separate recognition sheet. For example, the key 1056 may include a physical button, an optical key, or a keypad. The ultrasonic input unit 1058 may identify data by detecting an acoustic wave with a microphone (for example, microphone 1088) of the electronic device 1000 through an input unit for generating an ultrasonic signal, and may perform wireless recognition. According to an embodiment, the electronic device 1000 may receive a user input from an external device (for example, a computer or server) connected thereto using the communication module 1020.

The display 1060 (for example, the display 850 of FIG. 8) may include a panel 1062, a hologram device 1064, or a projector 1066. For example, the panel 1062 may be a Liquid Crystal Display (LCD), an Active Matrix Organic Light Emitting Diode (AM-OLED), or the like. For example, the panel 1062 may be implemented to be flexible, transparent, or wearable. The panel 1062 may be formed to be a single module with the touch panel 1052. The hologram device 1064 may be a three dimensional image in the air by using interference of light. The projector 1066 may project light onto a screen to display an image. For example, the screen may be located inside or outside the electronic device 1000. According to one embodiment, the display 1060 may further include a control circuit for controlling the panel 1062, the hologram device 1064, or the projector 1066.

For example, the interface 1070 may include a High-Definition Multimedia Interface (HDMI) 1072, a Universal Serial Bus (USB) 1074, an optical interface 1076, or a D-subminiature (D-sub) 1078. For example, the interface 1070 may be included in the communication interface 860 illustrated in FIG. 8. Additionally or alternatively, the interface 1070 may include, for example, a Mobile High-definition Link (MHL) interface, a Secure Digital (SD)/Multi-Media Card (MMC) interface, or an Infrared Data Association (IrDA) standard interface.

The audio module 1080 may bilaterally convert a sound and an electrical signal. For example, at least some elements of the audio module 1080 may be included in the input/output interface 840 illustrated in FIG. 8. For example, the audio module 1080 may process voice information input or output through a speaker 1082, a receiver 1084, earphones 1086, or a microphone 1088.

According to one embodiment, the camera module 1091 is a device that can capture still and moving images, and may include one or more image sensors (for example, a front sensor or a rear sensor), a lens (not illustrated), an image signal processor (ISP, not illustrated), or a flash (for example, an LED or a xenon lamp, not illustrated).

The power management module 1095 may manage power of the electronic device 1000. Although not illustrated, the power management module 1095 may include, for example, a Power Management Integrated Circuit (PMIC), a charger Integrated Circuit (IC), or a battery or fuel gauge.

For example, the PMIC may be mounted to an IC or an SoC semiconductor. Charging methods may be classified into a wired charging method and a wireless charging method. The charger IC may charge a battery and prevent introduction of over-voltage or over-current from a charger. According to one embodiment, the charger IC may include a charger IC for at least one of the wired charging method and the wireless charging method. A magnetic resonance type, a magnetic induction type, or an electromagnetic type may be exemplified as the wireless charging method, and an additional circuit for wireless charging, such as a coil loop circuit, a resonance circuit, a rectifier circuit, and the like may be added.

For example, the battery fuel gauge may measure the remaining amount of battery 1096, a charging voltage and current, or temperature. The battery 1096 may store or generate electricity and supply power to the electronic device 1000 using the stored or generated electricity. For example, the battery 1096 may include a rechargeable battery or a solar battery.

The indicator 1097 may display a particular state of the electronic device 1000 or a part thereof (for example, the AP 1010), for example, a boot-up state, a message state, a charging state, or the like. A motor 1098 may convert an electrical signal into a mechanical vibration. Although not illustrated, the electronic device 1000 may include a processing device (for example, a GPU) for supporting a mobile TV. For example, the processing unit for supporting a mobile TV may process media data according to a standard of Digital Multimedia Broadcasting (DMB), Digital Video Broadcasting (DVB), media flow, or the like.

The above described components of the electronic device according to various embodiments of the present disclosure may be formed of one or more components, and a name of a corresponding component element may be changed based on the type of electronic device. The electronic device according to the present disclosure may include at least one of the above-described elements. Some of the above-described elements may be omitted from the electronic device, or the electronic device may further include additional elements. Further, some of the components of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to some embodiments, an electronic device may include a communication module configured to receive an incoming call through a communication network, and a control module configured to check whether the incoming call is connected, to detect, if the incoming call is not connected, whether the incoming call is terminated, and to maintain, if the incoming call is terminated, a call notification in the same form as used when the incoming call is received.

The electronic device may further include a display module configured to display thereon the same call notification screen as displayed when the incoming call is received.

The display module may be further configured, when one or more of the incoming calls are received, to display, based on setting of the electronic device, the call notification screen associated with at least one of selected numbers of incoming calls, recent incoming calls, and specific numbers of incoming calls selected from the recent incoming calls.

The display module may be further configured, if an actual call is connected through the communication network while the call notification screen for a missed call is displayed, to distinctively display both a call notification screen for the actual call and the call notification screen for the missed call.

The electronic device may further include an output module configured to output, based on setting of the electronic device, at least one of a ringtone, a vibration, and a mute sound which is the same output as used when the incoming call is received.

The electronic device may further include an illumination unit configured to output light in case of the mute sound.

The electronic device may further include a sensor unit configured to obtain an angle or motion of the electronic device. The output module may be further configured to output, based on the obtained angle or motion, at least one of the ringtone, the vibration, and the mute sound.

The electronic device may further include a sensor unit configured to detect an ambient noise level of the electronic device. The output module may be further configured to output, based on the detected noise level, at least one of the ringtone, the vibration, and the mute sound.

The control module may be further configured to set the call notification to be maintained with regard to the incoming call from at least one of all phone numbers, stored phone numbers, selected phone numbers, blocked phone numbers, and non-blocked phone numbers.

The control module may be further configured to set the call notification to be maintained at least one of in a selected time zone, at every time except a specific time zone, and at all times.

The control module may be further configured to set a notification interval associated with the call notification or a type of a ringtone.

The communication module may be further configured, when a call button displayed with the call notification is selected, to try to connect a call with a phone number of the incoming call.

The control module may be further configured to notify that a call connection will incur a call charge.

As fully discussed hereinbefore, the present disclosure provide a missed call processing technique so that a call notification can be maintained in the same form as used when the missed call is received. This allows a user to recognize all missed calls instantly and easily.

While the present disclosure has been shown and described with reference to various embodiment thereof, it will be understood by those skilled in the art that various changes in form and details may be made therein without departing from the spirit and scope of the present disclosure as defined by the appended claims and their equivalents.

What is claimed is:

1. A method for processing a missed call at an electronic device, the method comprising:
    displaying a first call notification screen if an electronic device receives an incoming call through a communication network;
    determining whether the incoming call is terminated without connection; and
    displaying a second call notification screen if the incoming call is terminated without connection, the second call notification screen is in the same form as the first screen used when the incoming call is received,
    wherein the second call notification screen includes a message indicating a missed call, a calling phone number, and a call button as if an actual call is received.

2. The method of claim 1, wherein the displaying of the second call notification screen includes displaying one or more call notification screens when one or more of the incoming calls is received.

3. The method of claim 2, wherein the displaying of the second call notification screen includes displaying, based on a setting of the electronic device, the call notification screen associated with at least one of selected numbers of incoming calls, recent incoming calls, or specific numbers of incoming calls selected from the recent incoming calls.

4. The method of claim 1, wherein, when an actual call is connected through the communication network while the second call notification screen for a missed call is displayed, the displaying of the second call notification screen includes displaying both a call notification screen for the actual call and the call notification screen for the missed call such that the call notification screen for the actual call is distinguishable from the call notification screen for the missed call.

5. The method of claim 1, wherein the displaying of the second call notification screen includes displaying a screen which is the same output as used when the first call notification is outputted.

6. The method of claim 5, further comprising outputting light through a light emitter in case of the mute sound.

7. The method of claim 5, wherein the outputting of the second call notification includes at least one of:

obtaining an angle or motion of the electronic device using a sensor; or
based on the obtained angle or motion, outputting at least one of the ringtone, the vibration, or the mute sound.

8. The method of claim 5, wherein the outputting of the second call notification includes at least one of:
    detecting an ambient noise level of the electronic device using a sensor; or
    based on the detected noise level, outputting at least one of the ringtone, the vibration, or the mute sound.

9. The method of claim 1, wherein the displaying of the second call notification screen includes maintaining, based on setting of the electronic device, the call notification associated with the incoming call from at least one of all phone numbers, stored phone numbers, selected phone numbers, blocked phone numbers, or non-blocked phone numbers.

10. The method of claim 1, wherein the displaying of the second call notification screen includes maintaining, based on setting of the electronic device, the call notification at least one of in a selected time zone, at every time except a specific time zone, or at all times.

11. The method of claim 10, wherein the displaying of the second call notification screen includes maintaining the call notification associated with the incoming call from a selected phone number received in a selected time zone.

12. The method of claim 1, further comprising:
    setting a notification interval associated with the call notification or a type of a ringtone.

13. The method of claim 1, further comprising:
    when a call button displayed with the call notification is selected, trying to connect a call with a phone number of the incoming call.

14. The method of claim 13, wherein the trying includes notifying that a call connection will incur a call charge.

15. The method of claim 1, wherein the second call notification screen includes an end button for call-blocking.

16. The method of claim 1,
    wherein the method further comprises outputting the call notification if the incoming call is terminated without connection, and
    wherein the call notification comprises at least one of a ringtone or a vibration which is same output as used for the first screen of the call notification.

17. An electronic device comprising:
    a display;
    a transceiver configured to receive an incoming call through a communication network; and
    at least one processor configured to:
        control the display to display a first screen of a call notification if the transceiver receives the incoming call,
        determine whether the incoming call is terminated without connection, and
        control the display to display a second call notification screen if the incoming call is terminated without connection, the second call notification screen is in the same form as the first screen used when the incoming call is received,
    wherein the second call notification screen includes a message indicating a missed call, a calling phone number and a call button as if an actual call is received.

18. The electronic device of claim 17, wherein the display is further configured to, when one or more of the incoming calls is received, display, based on setting of the electronic device, the call notification screen associated with at least one of selected numbers of incoming calls, recent incoming calls, or specific numbers of incoming calls selected from the recent incoming calls.

19. The electronic device of claim 17, wherein the display is further configured to, when an actual call is connected through the communication network while the call notification screen for a missed call is displayed, display both a call notification screen for the actual call and the call notification screen for the missed call such that the call notification screen for the actual call is distinguishable from the call notification screen for the missed call.

20. The electronic device of claim 17, further comprising:
an output interface configured to output, based on setting of the electronic device, at least one of a ringtone, a vibration, or a mute sound which is the same output as used when the incoming call is received.

21. The electronic device of claim 20, further comprising:
a light emitter configured to output light in case of the mute sound.

22. The electronic device of claim 20, further comprising:
a sensor configured to obtain an angle or motion of the electronic device,
wherein the output interface is further configured to output, based on the obtained angle or motion, at least one of the ringtone, the vibration, or the mute sound.

23. The electronic device of claim 20, further comprising:
a sensor configured to detect an ambient noise level of the electronic device,
wherein the output interface is further configured to output, based on the detected noise level, at least one of the ringtone, the vibration, or the mute sound.

24. The electronic device of claim 17, wherein the at least one processor is further configured to set the call notification to be maintained with regard to the incoming call from at least one of all phone numbers, stored phone numbers, selected phone numbers, blocked phone numbers, or non-blocked phone numbers.

25. The electronic device of claim 17, wherein the at least one processor is further configured to set the call notification to be maintained at least one of in a selected time zone, at every time except a specific time zone, or at all times.

26. The electronic device of claim 17, wherein the at least one processor is further configured to set a notification interval associated with the call notification or a type of a ringtone.

27. The electronic device of claim 17, wherein the transceiver is further configured, when a call button displayed with the second call notification screen is selected, to try to connect a call with a phone number of the incoming call.

28. The electronic device of claim 27, wherein the at least one processor is further configured to notify that a call connection will incur a call charge.

29. The electronic device of claim 17, wherein the second call notification screen includes an end button for call-blocking.

30. The electronic device of claim 17,
wherein the at least one processor is further configured to outputting the call notification if the incoming call is terminated without connection, and
wherein the call notification comprises at least one of a ringtone or a vibration which is same output as used for the first screen of the call notification.

\* \* \* \* \*